United States Patent [19]

Ilieve

[11] 4,114,179
[45] Sep. 12, 1978

[54] CLAMPING CIRCUITS FOR TELEVISION SIGNALS

[75] Inventor: Peter John Ilieve, London, England

[73] Assignee: Decca Limited, London, England

[21] Appl. No.: 811,877

[22] Filed: Jun. 30, 1977

[30] Foreign Application Priority Data

Jul. 5, 1976 [GB] United Kingdom ............. 27935/76

[51] Int. Cl.² ................. H04N 9/535; H04N 5/18; H03G 11/00
[52] U.S. Cl. ............................ 358/34; 358/172; 307/237; 330/11; 328/172
[58] Field of Search ............... 358/11, 14, 34, 172; 307/237; 330/11; 328/151, 168, 172, 187

[56] References Cited

U.S. PATENT DOCUMENTS 2,843,666   7/1958   Preisig .................. 358/34

Primary Examiner—John C. Martin

[57] ABSTRACT

A clamping circuit in which a signal such as a line sequential color television signal is clamped to a reference, such as a black level by means of a corrective signal which is the integrated output of a current multiplier. The gain of the multiplier, which is fed with a signal corresponding to the difference between the signal that is to be clamped and the reference, varies from a maximum to a minimum during a period of clamping. Large initial error in the signal can be rapidly corrected and the final corrective signal corresponds to the average error during the period of clamping.

9 Claims, 5 Drawing Figures

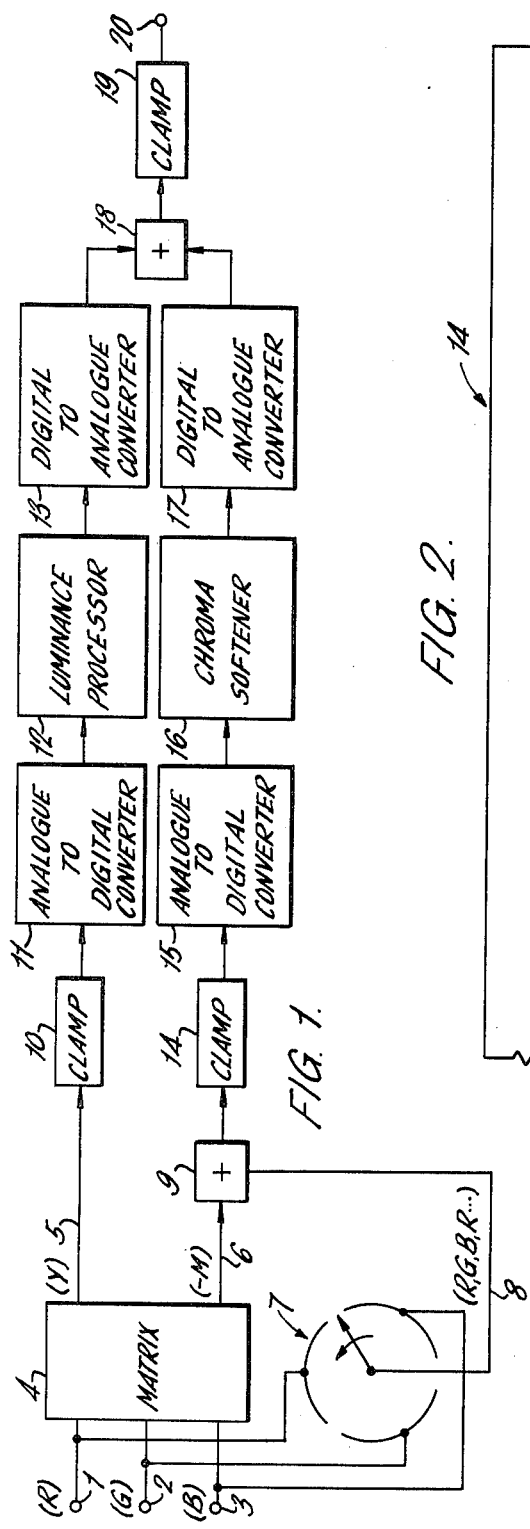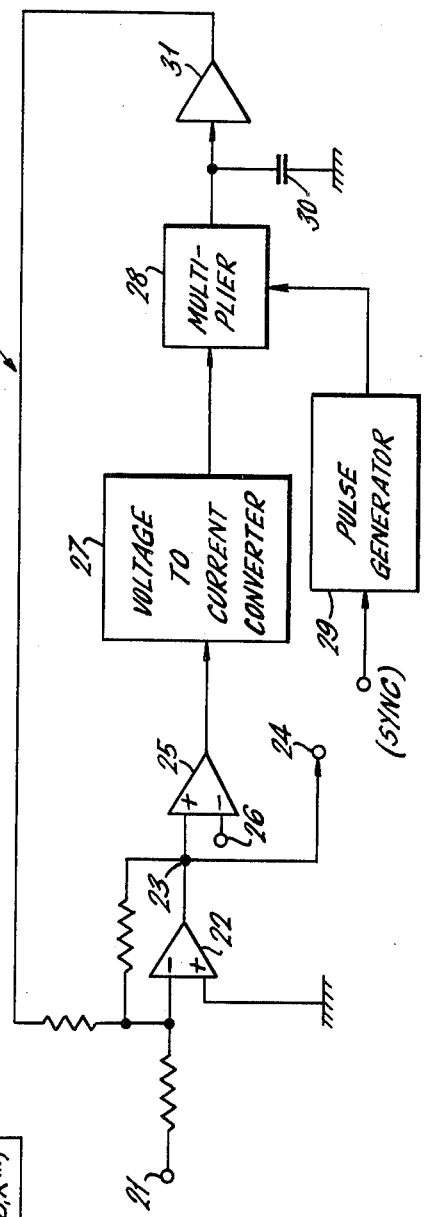

CLAMPING CIRCUITS FOR TELEVISION SIGNALS

This invention relates to the clamping of a signal to a reference level and in particular the periodic clamping of a television signal to a black level.

In a typical embodiment of the invention, an input signal is compared with a reference in order to develop an error signal which is used to reduce the disparity between the input signal and the reference. The error signal is amplified by a factor which is relatively large at the beginning of the period of clamping and diminishes during that period and the error signal is accumulated in a store such as a capacitor to provide a corrective signal. In effect, the sensitivity of a circuit which clamps as thus described is initially relatively great, in order that large disparities between the input signal and the reference signal can be corrected, and subsequently diminishes, so that the corrective signal at the end of the clamping period is principally determined not by magnitude of the input signal at the end of the period of clamping but by the average error, during the period of clamping, of the input signal.

The invention also relates to the conversion of simultaneous colour television signals into line sequential form, in which a luminance signal is accompanied, during each line, by one of several chrominance components which occur in line sequence. The successive lines of the television signal require clamping and the aforementioned clamping may be used, particularly, to clamp the line sequential chrominance signal, which is susceptible to errors in its black level because its components are significantly different in each new line.

A specific embodiment of the invention will now be described by way of example and with reference to the accompanying drawings, in which:

FIG. 1 is a schematic diagram of a line sequential colour television signal encoder;

FIG. 2 is a schematic diagram of a clamping circuit which constitutes part of the encoder;

Figure 3:
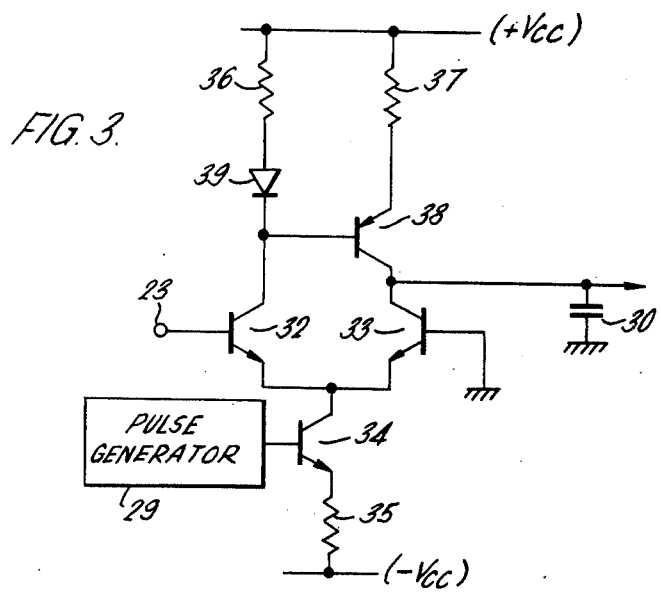
FIG. 3 is a diagram of an electrical circuit constituting part of the clamping circuit.

FIG. 1 represents an encoder which converts three primary colour television signals, for example red (R), green (G) and blue (B) into a signal in which the luminance component (Y) is accompanied by one of a set of chrominance components that occur in line sequence. In this embodiment the chrominance components are (R-M), (G-M) and (B-M) in turn; M is a special form of luminance signal whose value is (R + G + B)/3. The luminance signal Y is, as is usual, 0.3R + 0.59G + 0.11B. Other forms of luminance signal and chrominance components may be used, the necessary changes to the circuit being made.

The three primary signals R, G and B, which appear at the input terminals 1, 2 and 3 and which may be supplied by a television camera, proceed to a matrix 4 which provides the luminance signal Y on an output line 5 and a negative form of the modified luminance signal M on an output line 6. The primary signals are also fed to a cyclically scanning switch 7 which is conventionally illustrated as a mechanical switch but which is normally a set of electronic switches controlled by appropriate synchronising signals. The switch 7 samples the input signals at the line scanning rate and accordingly feeds a line 8 with a cyclic sequence of the input primary signals. This sequence is combined with the modified signal M by an adder 9 which accordingly provides at the line scanning rate a sequence of signals of the form (R-M), (G-M), (B-M), (R-M) ... etc. Thus for each new line the output of the adder is a signal which has a substantially different magnitude to that of the immediately preceding line of chrominance. Errors in the black level are therefore particularly likely at this point and in corresponding points in similar systems.

The luminance signal appearing on the line 5 passes through a clamp 10, which periodically clamps the luminance signal to a black level, and thence to an analogue-to-digital converter 11. After its conversion to digital form, the luminance signal is fed to a luminance processor 12, which works in the same manner as the luminance processor described in the specification of U.S. patent application Ser. No. 645,717, now U.S. Pat. No. 4,052,736 except for one difference which will be explained. The luminance signal is re-converted to an analogue form by a digital-to-analogue converter 13 and thence is fed to an adder 18. The chrominance signal issued by the adder 9 is passed through a clamp 14, which will be described in more detail, and proceeds to an analogue-to-digital converter 15 and thence to a chroma softener 16 which, with one principal difference, works in the same manner as the chroma softener described in the specification of our British Pat. No. 1453590. The chrominance component is re-converted to an analogue form by a digital-to-analogue converter 17 and is combined with the luminance signal by the adder 18. This adder's output, a luminance signal accompanied by a line sequential chrominance signal, passes through a clamp 19 to an output terminal 20.

The luminance processor combines at least a fraction of each line of the luminance signal with decreasing fractions of the earlier lines which are spaced from the instant line by integral cycles of the line sequence of chrominance components. It combines a fraction of each line with a fraction of an immediately preceding line and also combines each instant line with a signal which represents a comparison between a later line, following the instant line by a complete cycle of chrominance, and the average of the two lines that immediately precede said later line. The chroma softener combines a fraction of each line of the chrominance signal with fractions of chrominance components derived from the chrominance components of other lines. The purpose and manner of operation of the luminance processor and chroma softener are fully explained in the aforementioned specification. The purpose is to reduce the visibility of certain spurious signals which are inevitably produced by a decoder which by means of a comparison of like, spaced, chrominance components derives transient signals which compensate for the loss of detail produced by the averaging of low frequency components of a line sequential colour television signal when that signal is re-converted into a form in which the chrominance components are all present for every line. The aforementioned difference is the adaptation of the luminance processor and the chroma softener described in the aforementioned specification to digital operation. This adaptation requires the use of shift registers instead of delay lines and the consequential supplanting of analogue networks by corresponding digital devices where appropriate. The adaptation, which requires no further explanation to those skilled in the art, has the benefit of avoiding the use of delay lines which have to accommodate signals of wide bandwidth. The significance of the converters 11, 13, 15 and 17 will now be apparent. However, the analogue-to-digital converters normally have a limited dynamic range and the use of clamps which, during appropriate intervals, clamp the respective signals to a black level is desirable. The precise clamping of the chrominance signal to a black level at appropriate times is desirable, whether the luminance and chrominance signals be processed digitally or not, because any line-to-line change in black level might be visible as a colour change in a final picture. There are, usually, substantial line-to-line changes in the black level of the input of the adder 9 owing to differences between the black levels of the primary signals. A preferred embodiment of the clamp 14 is illustrated in FIGS. 2 and 3. The clamps 10 and 19 for the luminance signal and output signal respectively may be constituted in a similar manner but could be constituted by ordinary clamping circuits.

The clamp which is illustrated in FIG. 2 has an input terminal 21 which feeds a high gain operational amplifier 22 which has resistive input circuits by means of which the input signal that ought to be clamped is combined with a corrective signal which accumulates during periods of clamping. An output junction 23 of this amplifier is connected to an output terminal 24 from which the input signal, whether clamped or not, proceeds. The junction 23 is connected to one input of a difference amplifier 25 of which the other input terminal receives a reference signal ($V_r$). In this embodiment the reference signal is a voltage, with respect to earth, selected for the black level of the television signal. The output voltage of the amplifier 25 is converted to a current by means of a voltage-to-current converter 27. The resultant current is multiplied, during periods of clamping, by a factor which is determined by the magnitude of a control pulse from a pulse generator 29. The multiplying factor is initially large and decreases as the period of clamping progresses. The output of the multiplier is integrated by a capacitor 30. The voltage across the capacitor 30 constitutes the aforementioned corrective signal, which in this embodiment of the invention is amplified by a buffer amplifier 31 and fed back to the input of the primary amplifier 22 in combination with the input signal. Accordingly, any disparity between the input signal and the reference signal at terminal 26 will be corrected, at a rate determined by the multiplication factor of the multiplier 28. During intervals when the input signal is not clamped, the multiplication factor is zero and the input signal merely passes to the output terminal 24.

The output current $I_c$ of the multiplier 28 may be expressed as $(V_o - V_r) K_1 K_2 K_3$, in which $V_o$ is the corrected input voltage and $K_1$, $K_2$ and $K_3$ are, respectively, the gain of the difference amplifier 25, the gain of the voltage-to-current converter and the gain of the multiplier 28.

FIG. 3 illustrates a specific embodiment of that part of the circuit in FIG. 2 between and including the amplifier 25 and the capacitor 30. In this specific embodiment, the transistors 32 and 33 constitute the difference amplifier 25 and compare the corrected input voltage, which is also the output voltage, with a reference, in this example zero, between the base of the transistor 33 and ground. The emitters of the transistors 32 and 33 are conjointly connected to the collector of a transistor 34 of which the base is connected to receive pulses from the pulse generator 29 and of which the emitter is connected by a resistor 35 to a negative line which is at a potential $-V_{cc}$ relative to ground. If the transistor 34 is conductive, its collector current I, which is determined by the voltage at the base of this transistor and the resistor 35, is shared between the transistors 32 and 33 in dependence on the output voltage appearing between the point 23 and ground. The current that flows into the transistor 32 causes a voltage drop across a resistor 36 connected between the collector of that transistor and a positive line. The voltage which appears across the resistor 36 is transferred, to appear across a resistor 37, by a transistor 38. The voltage drop between the base and emitter of the transistor 38 is compensated by a diode 39 in series with the resistor 36. Accordingly, a current equal to that flowing into the transistor 32 flows from the transistor 38. The difference between the current flowing from the transistor 38 and the current flowing into the transistor 33 flows to or from the capacitor 30, the voltage across the capacitor varying accordingly. The current into the capacitor can vary throughout the range ± I. The limits of the range are determined by the voltage at the base of the transistor 34 and the particular value of the current flowing into or away from the capacitor 30 is determined by the voltage at the terminal 23. The capacitor's voltage is thereby an integration of the error of the input signal. The amplifier 31 should present a high input impedance to the capacitor 30.

If the voltage at the base of the transistor 34 is depressed to $-V_{cc}$, the transistor 34 is rendered non-conductive, as are the transistors 32 and 33. Then the voltage on the capacitor cannot change and the gain of the multiplier is effectively zero.

Figure 4:
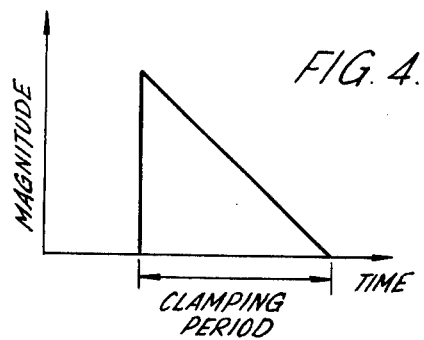
FIGS. 4 and 5 are explanatory diagrams.

The circuit of FIG. 3 is operated by a periodic, triangular pulse of which one cycle, and the corresponding variation in $K_3$, are illustrated by FIG. 4. The base line of the pulse is $-V_{cc}$ volts. At the beginning of the clamping period the pulse voltage rises to some less negative value and subsequently falls steadily to the base value. Accordingly the multiplier's gain initially rises rapidly to a maximum and then decreases steadily to a minimum. This minimum is preferably zero. The multiplier's gain remains at that minimum until the next clamping period. The pulse is provided by the pulse generator which may assume any suitable form and which may be triggered in the same manner as any normal clamp pulse generator which provides clamping in response to, and immediately after, television synchronising signals. It is preferable, in the described system, to insert synchronising pulses after the luminance and chrominance signals have been processed and accordingly the usual circuits for this purpose are not illustrated. Synchronising signals are normally available in a studio and would be used to trigger the pulse generator.

If the clamping circuit is used otherwise than in the encoder according to FIG. 1, then in general the operating pulse should be as illustrated in FIG. 4 when it is necessary or appropriate to clamp the input signal to the reference level.

Figure 5:
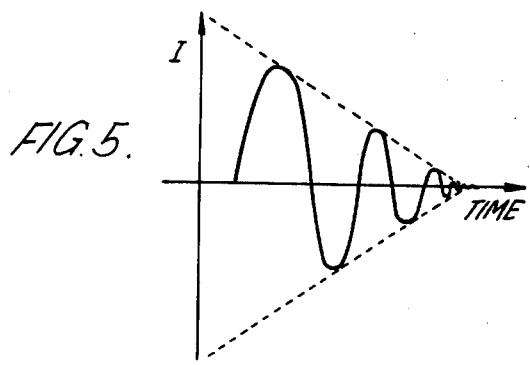

The clamping circuit will work satisfactorily even if there is a substantial variation in the input signal during the clamping period. The variation may be caused by the familiar colour burst which normally occurs during the interval between the lines of a television picture signal. Provided that the signal frequency of the colour burst is high enough so that there are more than a very few cycles of the colour burst during the clamping period, the clamping circuit will still clamp the mean level of the input signal to the reference signal. FIG. 5 is a diagram of the charging current of the capacitor and particularly illustrates the variation of the charging current in the presence of a colour burst in the input signal.

The clamping circuit that has been described can remove large line-to-line errors in the black level of the television signal but need not be unduly sensitive to noise in the input signal during the clamping period. It does not normally produce a residual visible indication of clamping to the black level during the next succeeding line of the television picture signal.

I claim:

1. A method of clamping an input signal to a reference, in which method the amplification of an error signal, which represents disparity between the input signal and the reference, is greatest at the beginning of a period of clamping and diminishes during that period, and the error signal is integrated before it is applied to reduce the disparity.

2. A method according to claim 1, in which the input signal is a television signal which is periodically clamped to a black level.

3. A method according to claim 2, in which the input signal is a line-by-line sequence of different chrominance signals.

4. A method according to claim 1, in which the error signal is amplified by an amplifier of which the gain depends on the signal level at a control input which is fed with a pulse which delimits the period of clamping and the gain of the amplifier varies in response to the pulse from a maximum at the beginning of the clamping period to zero at the end of the clamping period.

5. A method according to claim 4 in which the amplifier is a multiplier of current and feeds a capacitor which accumulates a voltage which represents the integrated error signal and is applied to reduce the said disparity by way of an amplifier which presents a high impedance to the capacitor.

6. A clamping circuit comprising means for combining an input signal with a corrective signal to provide an output, a comparator for comparing the said output with a reference, an amplifier for the difference between the said output and the reference, the amplifier having a variable gain, a pulse generator disposed to provide a control pulse in response to which the gain of the amplifier varies from a maximum at the beginning of a period of clamping to a minimum at the end of the period and an integrator for integrating the output of the amplifier to provide the corrective signal.

7. A clamping circuit according to claim 6 in which the amplifier is a current multiplier and the integrator comprises a capacitor followed by a buffer amplifier of high input impedance.

8. A clamping circuit according to claim 6 in which the amplifier comprises a differential transistor amplifier of which the two amplifying halves are disposed to receive a respective share, according to the said difference, of a variable current from a current source controlled by the said control pulse, and means are provided to develop, in response to a voltage developed by the current flowing in one half of the differential amplifier a corresponding current which opposes the current flowing in the other half of the differential amplifier, the integrator comprising a capacitor disposed to receive the resultant of the opposing currents.

9. In an encoder for the conversion of simultaneous colour television signals into a line sequential signal, said encoder including a sampling switch arranged to sample, at a line scanning rate, a plurality of colour television signals and to present said signals in the form of a line sequential signal and a clamping circuit which is operable periodically to clamp the line sequential signal, the improvement of a clamping circuit which comprises:

means for combining said line sequential signal with a corrective signal to provide an output;

a comparator for comparing the said output with a reference;

an amplifier coupled to amplify the difference between the output and the reference;

means including a pulse generator for defining a period of clamping;

means for varying the gain of said amplifier from a maximum to a minimum during said period; and means for accumulating an output of the said amplifier to provide said corrective signal.

* * * * *